United States Patent
Nguyen et al.

(10) Patent No.: US 7,740,538 B2
(45) Date of Patent: *Jun. 22, 2010

(54) MATCHING BONUSING METHOD USING A PLAYER TRACKING CARD

(75) Inventors: Binh T. Nguyen, Reno, NV (US); Craig Paulsen, Reno, NV (US)

(73) Assignee: IGT, Reno, NV (US)

(*) Notice: Subject to any disclaimer, the term of this patent is extended or adjusted under 35 U.S.C. 154(b) by 1283 days.

This patent is subject to a terminal disclaimer.

(21) Appl. No.: 10/754,186

(22) Filed: Jan. 8, 2004

(65) Prior Publication Data

US 2005/0153773 A1  Jul. 14, 2005

(51) Int. Cl.
*A63F 9/24* (2006.01)
*G06Q 30/00* (2006.01)

(52) U.S. Cl. .............................. 463/25; 463/12; 463/20; 463/30; 235/375; 235/377; 235/382; 705/14.1; 705/14.12; 705/14.27

(58) Field of Classification Search ........................ None
See application file for complete search history.

(56) References Cited

U.S. PATENT DOCUMENTS

| | | | |
|---|---|---|---|
| 4,367,876 A * | 1/1983 | Kotoyori ................. | 273/121 A |
| 5,292,127 A | 3/1994 | Kelly et al. | |
| 5,429,361 A * | 7/1995 | Raven et al. ................... | 463/25 |
| 5,613,912 A * | 3/1997 | Slater ........................... | 463/25 |
| 5,702,304 A | 12/1997 | Acres et al. | |
| 5,707,285 A | 1/1998 | Place et al. | |
| 5,770,533 A * | 6/1998 | Franchi ....................... | 463/42 |
| 5,816,918 A | 10/1998 | Kelly et al. | |
| 5,871,398 A | 2/1999 | Schneier et al. | |

(Continued)

FOREIGN PATENT DOCUMENTS

EP            1321911           6/2003

(Continued)

OTHER PUBLICATIONS

Office Action dated Mar. 18, 2008 from U.S. Appl. No. 10/754,395.

(Continued)

*Primary Examiner*—M. Sager
(74) *Attorney, Agent, or Firm*—Weaver Austin Villeneuve & Sampson LLP

(57) ABSTRACT

Methods and apparatus are disclosed for providing a bonus award to a gaming player for using a player tracking account associated with a gaming establishment. Provision of a bonus award is based on the access to a player tracking account. Specifically, once a gaming system detects that a gaming player has accessed a player tracking account associated with the gaming establishment, the gaming system can determine whether the player accessed the player tracking account in a manner meeting one or more bonus award criteria. For instance, the bonus award criteria can include accessing a player tracking account within a limited period of time allotted for awarding the bonus award, accessing a player tracking account according to a specified sequence with respect to accesses by other gaming players, or some other criterion. If the player accessed the player tracking account in a manner meeting the bonus award criterion or criteria, then a bonus award is provided to the gaming player for using the player tracking account.

52 Claims, 7 Drawing Sheets

U.S. PATENT DOCUMENTS

| | | | |
|---|---|---|---|
| 5,876,284 | A | 3/1999 | Acres et al. |
| 5,931,467 | A | 8/1999 | Kamille |
| 5,971,271 | A | 10/1999 | Wynn et al. |
| 6,007,426 | A | 12/1999 | Kelly et al. |
| 6,015,344 | A | 1/2000 | Kelly et al. |
| 6,048,269 | A | 4/2000 | Burns et al. |
| 6,135,884 | A | 10/2000 | Hedrick et al. |
| 6,146,273 | A | 11/2000 | Olsen |
| 6,162,122 | A | 12/2000 | Acres et al. |
| 6,217,448 | B1 | 4/2001 | Olsen |
| 6,227,972 | B1 * | 5/2001 | Walker et al. ............... 463/25 |
| 6,231,445 | B1 | 5/2001 | Acres |
| 6,244,958 | B1 | 6/2001 | Acres |
| 6,254,483 | B1 | 7/2001 | Acres |
| 6,424,949 | B1 | 7/2002 | Deaton et al. |
| 6,612,928 | B1 * | 9/2003 | Bradford et al. ............ 463/29 |
| 6,623,357 | B2 | 9/2003 | Chowdhury |
| 6,636,892 | B1 | 10/2003 | Philyaw |
| 6,887,154 | B1 | 5/2005 | Luciano et al. |
| 7,037,195 | B2 * | 5/2006 | Schneider et al. .......... 463/25 |
| 7,083,518 | B2 * | 8/2006 | Rowe ........................ 463/29 |
| 7,171,694 | B1 * | 1/2007 | Jespersen et al. ............ 726/27 |
| 2003/0109304 | A1 | 6/2003 | Gauselmann |
| 2003/0125107 | A1 | 7/2003 | Cannon |
| 2003/0207711 | A1 | 11/2003 | Rowe |
| 2003/0232647 | A1 | 12/2003 | Moser |
| 2004/0053679 | A1 | 3/2004 | Getz et al. |
| 2005/0037841 | A1 | 2/2005 | de Waal et al. |
| 2005/0054412 | A1 | 3/2005 | Gauselmann |

FOREIGN PATENT DOCUMENTS

| | | |
|---|---|---|
| WO | WO 03/026381 | 4/2003 |

OTHER PUBLICATIONS

U.S. Office Action dated Jul. 12, 2007, from U.S. Appl. No. 10/754,395.

US Office Action dated Sep. 12, 2008 from U.S. Appl. No. 10/754,395.

Chinese. Office Action dated Nov. 28, 2008, from Application No. 200580002148.8.

Chinese Office Action dated Oct. 16, 2009, from Application No. 200580002148.8.

Austalian Office Action dated Nov. 17, 2009, from Application No. 2005207311.

European Examination Report from corresponding European Application No. 05705339.9—2221, dated Jul. 9, 2007 (11 pages).

International Search Report and Written Opinion dated Aug. 22, 2005, from corresponding PCT Application No. PCT/US2005/000629 (11 pages).

* cited by examiner

MATCHING BONUSING METHOD USING A PLAYER TRACKING CARD

CROSS-REFERENCE TO RELATED APPLICATIONS

This application is related to U.S. patent application Ser. No. 09/903,095 entitled "BONUS SYSTEM AND METHOD OF AWARDING A BONUS," filed on Jul. 10, 2001, by Rowe, now abandoned, and U.S. patent application Ser. No. 10/754,395, entitled "GAMING MACHINE BONUSING METHOD UTILIZING A PLAYER TRACKING CARD," filed on Jan. 8, 2004, by Paulsen, both of which are incorporated by reference herein in their entirety for all purposes.

BACKGROUND OF THE INVENTION

I. Field of the Invention

The present invention relates to gaming machines. More particularly, the present invention relates to methods and apparatus for providing a bonus award for using a player-tracking account associated with a gaming establishment.

II. Background

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine. In addition, many of these devices can be integrated into a player tracking unit.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play. Maintaining a game player's interest in game play, such as on a gaming machine or during other gaming activities, is an important consideration for an operator of a gaming establishment.

One related method of maintaining a game player's interest in game play are player tracking programs which are offered at various casinos. Player tracking programs provide rewards, or "comps," to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines and video slot gaming machines. In a gaming machine, a player tracking program is implemented using a player tracking unit installed in the gaming machine and in communication with a remote player tracking server. Player tracking units are usually manufactured as an after-market device separate from the gaming machine. Many different companies manufacture player tracking units as part of player tracking/accounting systems. These player tracking/accounting systems are used in most casinos. Most casinos utilize only one type of player tracking system (i.e. from one manufacturer) while the type of player tracking system varies from casino to casino.

Typically, when a game player wants to play a game on a gaming machine and utilize the player tracking services available through the player tracking unit, a game player inserts a player tracking card, such as a magnetic striped card, into a card reader located on a player tracking unit of a gaming machine. After the magnetic striped card has been so inserted, the player tracking unit may detect this event and receive certain identification information contained on the card. For example, a player's name, address, and player tracking account number encoded on the magnetic striped card, may be received by the player tracking unit. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

During game play on the gaming machine, the player tracking unit may poll the gaming machine for game play information such as how much money the player has wagered on each game, the time when each game was initiated, and the location of the gaming machine. The game play information is sent by the player tracking unit to a player tracking server. While a player tracking card is inserted in the card reader, the player tracking server may use the game play information provided by the player tracking unit to generate player tracking points and add the points to a player tracking account identified by the player tracking card. The player tracking points generated by the player tracking server are stored in a memory of some type on the player tracking server.

Player tracking cards and player tracking programs have become a de facto marketing method at casinos. A casino can obtain valuable marketing information from player tracking programs and provide loyalty incentives to players. These loyalty incentives provide a way to maintain a player's interest in playing games at a particular casino once a player has initiated game play with a player tracking card.

Accordingly, it is desirable to encourage players to initiate game play by using their player tracking cards. Once the players initiate game play, the traditional player tracking programs can be used even more effectively to maintain player interest in the games, and to provide gaming establishments with valuable information that allows them to better serve their players.

SUMMARY OF THE INVENTION

The techniques of the present invention address the above need by providing methods, code and apparatus for providing a bonus award for using a player-tracking account associated with a gaming establishment. More particularly, in accordance with various embodiments, the techniques of the present invention allow a bonus award to be provided based on the insertion of a player tracking card into a gaming machine or other access to a player tracking account.

One aspect of this invention pertains to a method of providing a bonus award for using a player tracking account associated with a gaming establishment. This method may be characterized by the following sequence of operations (typically implemented on a computing device): (a) detecting that a gaming player has accessed the player tracking account; (b) determining whether the player accessed the player tracking account within a limited period of time allotted for awarding the bonus award for using the player tracking account; (c) determining whether the player accessed the player tracking account in a manner meeting an additional criterion for awarding the bonus award; and (d) if the player accessed the player tracking account in a manner meeting the additional criterion and within the limited period of time, providing the bonus award for using the player tracking account.

Another aspect of the invention pertains to a method of providing a bonus award for using a player tracking account associated with a gaming establishment. Such method may be characterized by the following sequence: (a) detecting that a gaming player has accessed the player tracking account; (b) determining whether the player's access to the player tracking account matches a specified sequence number in a sequence of player tracking account accesses by multiple players; and (c) if the player's access to the player tracking account matches the specified sequence number, providing the bonus award for using the player tracking account.

Yet another aspect of this invention pertains to a gaming machine. Such gaming machine may be characterized by the following features: (a) one or more processors controlling game play on the gaming machine; (b) a player tracking device comprising a light bezel, a video display, and a player tracking card reader; (c) a network interface for communications between the player tracking device and a remote player tracking server; and (d) logic for lighting the light bezel upon issuance of a bonus award triggered by insertion of the player tracking card in the card reader.

Still another aspect of this invention pertains to a gaming machine system. Such gaming machine system may be characterized by the following features: (a) a plurality of gaming machines, each comprising: one or more processors controlling game play on the gaming machine, a player tracking device comprising a light bezel, a video display, and a player tracking card reader, and a network interface for communications to and from the player tracking device; and (b) a player tracking server comprising: a server network interface for communicating with said player tracking devices; and logic for issuing a bonus award triggered by insertion of a player tracking card in the card reader at one of the gaming machines (i) during a limited period of time allotted for awarding said bonus award, (ii) when insertion of the player tracking card matches a specified sequence number in a sequence of other player tracking card insertions at the plurality of gaming machines, or when both (i) and (ii) occur.

Yet another aspect of the invention pertains to computer program products including machine-readable media on which are stored program instructions for implementing a portion of or an entire method as described above. Any of the methods of this invention may be represented, in whole or in part, as program instructions that can be provided on such computer readable media. In addition, the invention pertains to various combinations of data generated and/or used as described herein.

These and other features and advantages of the present invention will be described in more detail below with reference to the associated figures.

DETAILED DESCRIPTION OF INVENTION

Figure 1A:
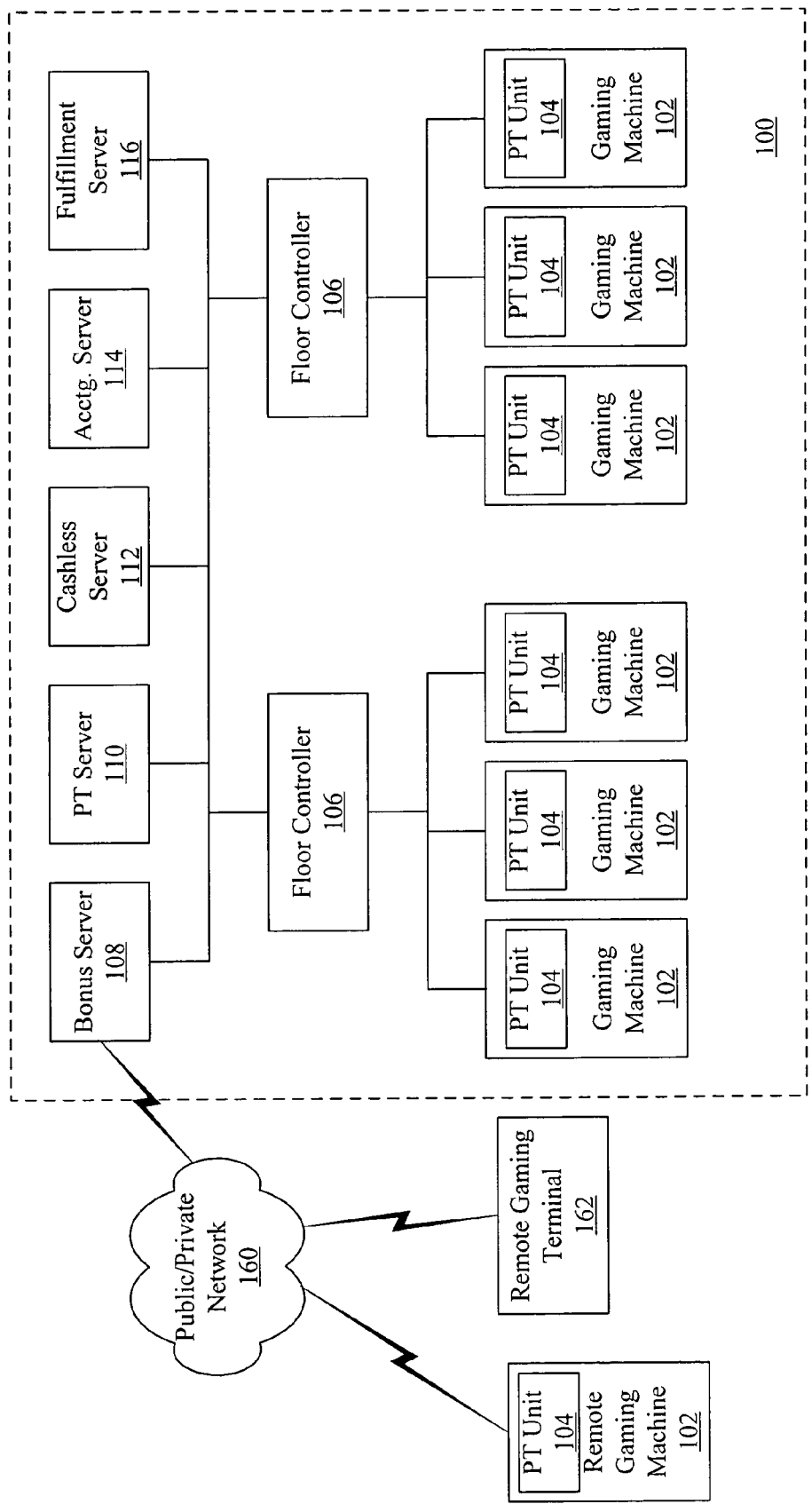
FIG. 1A is a block diagram of a gaming system configured to present bonus awards based on access to a player tracking account.

As described above, player tracking cards and player tracking programs are becoming more and more popular. This popularity is due at least in part to various incentives for gaming establishments and players to participate in player tracking programs. Some of the incentives for a gaming establishment to provide player tracking services include generating "brand" loyalty, gathering valuable information that may be used for marketing and providing better customer services. In particular, player tracking programs allow a gaming establishment to identify and reward customers based upon their previous game play history. A typical goal of many gaming establishments is to identify and then to provide a higher level of service to certain groups of players identified as especially valuable to the gaming establishments. For instance, players that visit the gaming establishment, on average, once a week may be deemed as "special" customers and the gaming establishment may desire to cultivate a "special" relationship with these customers. When players fail to use player tracking cards when playing games on gaming machines, the gaming establishment operating the gaming machines is deprived of valuable marketing information and is unable to provide loyalty incentives. In addition, the gaming establishment is unable to cultivate a special relationship with the player because their playing attributes remain unknown.

As suggested above, players have an incentive to use the player tracking services in order to earn player tracking points and other rewards provided by the gaming establishment. Some player tracking programs also include another feature that can provide additional incentives for using player tracking services. In particular, bonuses may be awarded during game play to players using player tracking cards. Unlike points accrued during player tracking programs in direct proportion to the level or frequency of play, these bonuses may be random in nature and/or tied to specific gaming machines. For instance, a typical method for providing bonuses to players includes setting aside a fraction of the money or other indicia of credit input by players to a set of gaming machines. When this fraction reaches a certain threshold, such as $1000, this amount is awarded to one of the players of the set of gaming machines. The winner of this bonus award may be chosen randomly from the specific set of gaming machines participating in the bonus program. Because a player's odds of winning a bonus increases with longer periods of game play, a player has an incentive to continue playing a game for the chance to receive a bonus. Accordingly, player tracking loyalty and bonusing programs are effective at maintaining interest in game play once a player has initiated game play.

Accordingly, it is desirable to encourage players to initiate game play. More specifically, it is desirable to provide an incentive for players to use their player tracking cards to initiate game play. Once the players initiate game play, the traditional player tracking and bonusing methods can be used even more effectively to maintain player interest in the games, and to provide gaming establishments with information that can allow them to more effectively provide services to players.

The techniques of the present invention address the above need by providing methods, code and apparatus for encouraging players to initiate game play. More particularly, the techniques of the present invention provide players with a chance to win a bonus award based on access to a player tracking account, such as by the initial insertion of a player tracking card into a gaming machine or by the use of a virtual player tracking card during an Internet gaming session. As described in more detail below, a bonus award can be based on the time, sequence, or other criteria associated with the insertion of a player tracking card or other access to a player tracking account.

Turning to FIG. 1A, shown is a block diagram of one embodiment of a gaming system configured to present bonus awards based on access to a player tracking account. More particularly, gaming system 100 can include gaming machines 102, floor controllers 106, and various servers 108, 110,112, 114, and 116, coupled by a network that can include an Internet, wired, wireless, or other connection. Furthermore, gaming system 100 can be connected to any number of LANs, WANs, and/or the Internet. Gaming system 100 can be a gaming establishment such as a casino, group of affiliated casinos, or the like.

As shown, gaming machines 102 can include player tracking units 104. As described in more detail below, these player tracking units 104 can be used to present bonus awards and provide bonus award presentations based on the insertion of a player tracking card into a player tracking device. Gaming machines 102 are coupled to servers 108, 110,112, 114, and 116 through floor controllers 106. Various servers such as bonus server 108, player tracking server 110, cashless server 112, accounting server 114, and fulfillment server 116 can be included in gaming system 100. In some embodiments, one or more of the servers can be combined or omitted. Similarly, additional servers can be included depending on the application.

In the present embodiment, the player tracking server 120 stores player tracking account information. This player tracking account information can include player identification, records including the number of player tracking points previously accumulated by a player, records including the rewards or awards won by the player, player preferences, and the like. In some embodiments, the player account information may not specify the identity of a player holding the account, such as when anonymous cards are distributed to a tour group. In addition, the player account information can include a virtual player tracking card, which specifies a player account number that allows a person to access a player tracking account over an Internet connection via a terminal such as a personal computer, a cell phone, or the like. In addition to storing player account information, player tracking server 120 can alone, or in conjunction with bonus server 108, detect that a player has accessed a player tracking account. Upon detecting such access, at least one of these servers can determine whether the player's access meets a bonus award criterion, such as insertion of a player tracking card into the gaming machines during a limited period of time, according to a specified sequence, or the like, as described in more detail below. If the bonus award criterion is met, then at least one of these servers can send instructions for a bonus award presentation to the player tracking unit 104 where the bonus award should be presented. Furthermore, in some embodiments, at least one of these servers can notify the gaming establishment or other gaming personnel that a bonus award has been provided. In some embodiments where the player tracking server 110 carries out many of the functions described above, bonus server 108 can be omitted or combined with player tracking server 110. In other embodiments, bonus server 108 can store information regarding bonus award presentations that are accessible to player tracking units 104.

Other servers such as cashless server 112, accounting server 114, and fulfillment server 116 can also be included in gaming system 100. For instance, cashless server 112 can provide cashless services, such as validating printed ticket vouchers used as indicia of credit. Furthermore, accounting server 114 can keep records of a player's casino financial account, and fulfillment server 116 can enable the fulfillment of in-kind prizes as part of a player's redemption of a prize or following an award of an in-kind prize.

In the present embodiment, gaming system 100 can be connected to computers or other machines or devices, such as those engaged in Internet gaming. For instance, any number of remote gaming terminals 162 such as personal computers, cell phones, interactive TVs, gaming machines, or the like, can be connected to gaming system 100 through a public or private network 160. One example of a public network includes an Internet connection. Remote gaming machine 102 can also be connected to gaming system 100 through public or private network 160. This remote gaming machine 102 can be located on properties related to the gaming establishment, or non-related properties that are participating in a joint bonusing promotion. As shown, the Internet connection can be coupled to one or more servers in system 100, thereby allowing access to a plurality or all of the servers.

Although a particular configuration of servers and gaming machines are shown in gaming system 100, it should be recognized that modifications can be made within the scope of the present invention. For instance, although three gaming machines 102 are shown coupled to each of floor controllers 106, it should be recognized that any number of gaming machines 102 and any number of floor controllers 106 can be included. Furthermore, various servers shown can be combined or omitted. Additional servers can also be included within the scope of the present invention. In addition, connection 160 can join any number of remote gaming terminals 162, such as personal computers, cell phones, gaming machines, and the like, to gaming system 100 through any of the servers 108,110,112, 114, and 116 or any other gaming system 100 component. Furthermore, bonusing over the player tracking network can be spread over a wide area network, thus allowing multiple properties and multiple gaming devices to participate in the same bonusing scheme.

Figure 1B:
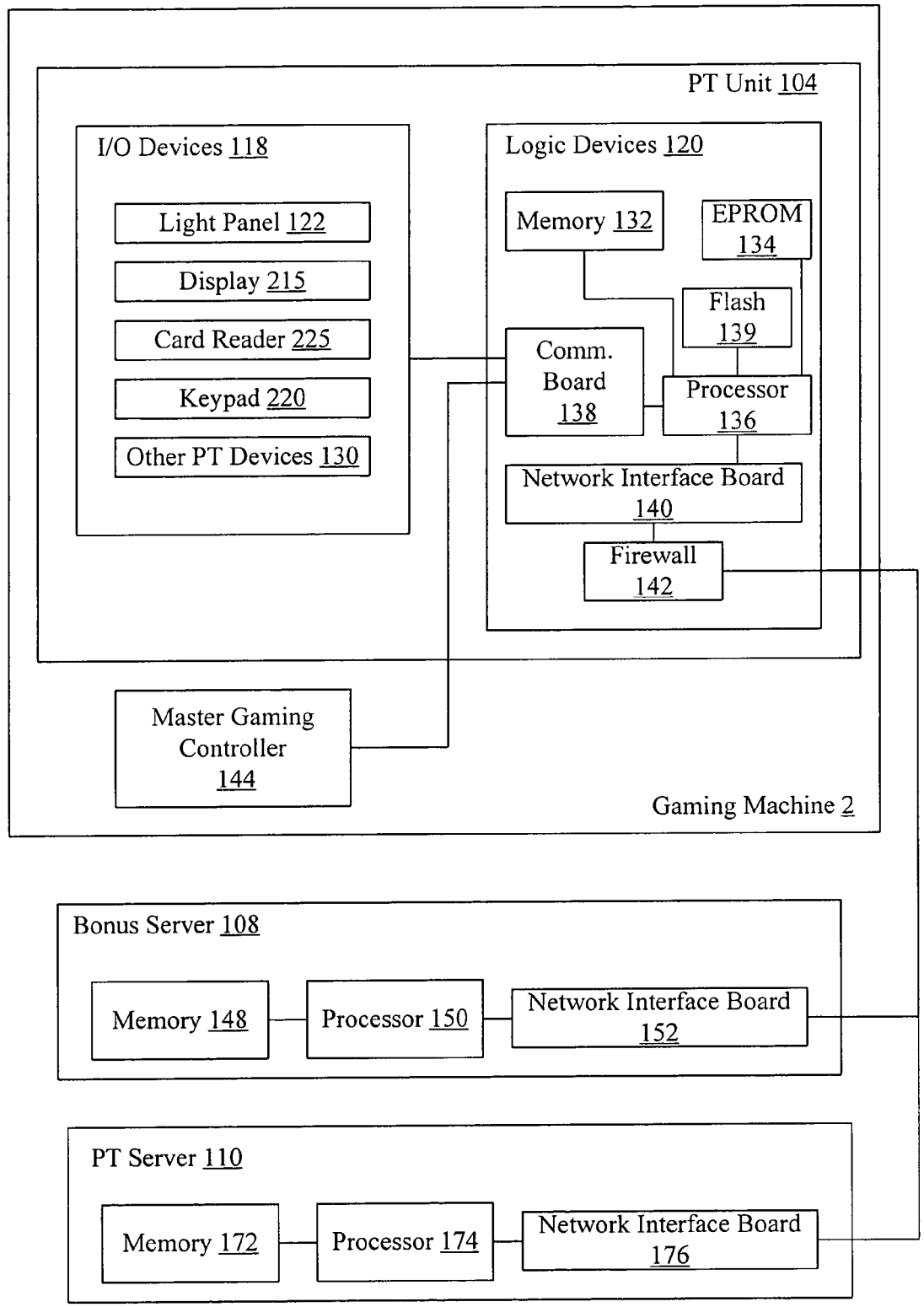
FIG. 1B is a block diagram showing various components of a gaming machine, a bonus server, and a player tracking server.

With reference to FIG. 1B, shown is a block diagram depicting one embodiment of various components of a gaming machine, a bonus server, and a player tracking server. Gaming machine 2 is connected through network interface board 140 and firewall 142 to bonus server 108 and player tracking server 110. As described above with regard to FIG. 1A, this connection can be an Internet, wired, wireless, or other connection, and can join any number of servers or components of gaming system 100 (FIG. 1A). As shown, gaming machine 2 includes master gaming controller 144 configured to present one or more games on the gaming machine 2. In particular, the master gaming controller 144 executes a number of gaming software programs to operate input/output devices such as coin hoppers, bill validators, coin acceptors, speakers, printers, lights (e.g. 122), displays (e.g. 215), card readers (e.g. 225), keypads (e.g. 220), and the like, and any other gaming machine mechanisms.

Gaming machine 2 also includes player tracking unit 104, which includes input/output devices 118 and logic devices 120. As described in more detail below with regard to FIG. 2, input/output devices 118 can include a light panel 122, display 215, card reader 225, keypad 220, and other player tracking devices 130, depending on the application. Light panel 122 can include lights on a bezel adjacent to display 215, lights adjacent card reader 225, or the like, as described in conjunction with FIG. 2 below, or any other lights on player tracking unit 104. Display 215 can be a video display, an LCD screen, a fluorescent display, a plasma screen, an LED display, a touch screen, touch pad, or the like. Card reader 225 can be configured to receive a player tracking card, or the like. Keypad 220 can include input buttons, or the like. In addition, the input/output devices 118 can include other player tracking devices 130, coin hoppers, bill validators, coin acceptors, speakers, printers, and the like, depending on the application. Although specific input/output devices 118 are shown, any combination of input/output devices can be included. For instance, in some applications, keypad 220 can be omitted, such as when display 215 is a touch screen configured to allow both input and output. In other applications, keypad 220 can be included even if display 215 is a touch screen, in order to appeal to more game players.

The input/output devices 118 can be coupled to logic devices 120 through communication board 138. The logic devices 120 may include a processor for executing software that allows the player tracking unit to perform various player tracking functions such as communicating with the player tracking server 110, communicating with the master gaming controller 144, or operating the various peripheral devices such as the input/output devices 118. For instance, logic devices 120 may send messages containing player tracking information to the display 215. As another example, the logic devices 120 may send commands to the light panel 122 to display a particular light pattern and to a speaker to project a sound to visually and aurally convey game information. In one embodiment, application software for the player tracking unit 104 and configuration information for the player tracking unit may be stored in a memory device such as an EPROM 134, a non-volatile memory, hard drive or a flash memory.

The player tracking unit may include a memory 132 configured to store: 1) player tracking software such as data collection software, 2) player tracking communication protocols allowing the player tracking unit 104 to communicate with different types of player tracking servers, 3) device drivers for many types of player tracking interface devices (e.g. 118), 4) a secondary memory storage device such as a non-volatile memory device, configured to store gaming software related information (the gaming software related information and memory may be used in a game download process or other software download process), and 5) communication network protocols such as Ethernet, USB, IEEE 1394, Bluetooth, IEEE 802.11a, IEEE 802.11b, IEEE 802.1x (e.g. other IEEE 802.1 standards), hiperlan/2, and HomeRF that allow the player tracking unit to communicate with devices using these protocols or communication protocols that allow the logic device to communicate with different types of master gaming controllers (e.g. master gaming controllers using different types of communication protocols). Typically, the master gaming controller, such as 144, communicates using a serial communication protocol. A few examples of serial communication protocols that may be used to communicate with the master gaming controller include but are not limited to USB, RS-232 and Netplex (a proprietary protocol developed by IGT, Reno, Nev.).

The logic devices 120 include a network interface board 140 configured or designed to allow communication between the player tracking unit 104 and other remote devices such as the player tracking server 110 and bonus server 108 residing on local area networks, such as a casino area network, a personal area network such as a piconet (e.g. using Bluetooth), or a wide area network such as the Internet. The network interface board 140 may allow wireless or wired communication with the remote devices. The network interface board may be connected to a firewall 142. The firewall may be hardware, software, or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The logic devices 120, using appropriate device drivers, may send instructions to the various player tracking devices to perform specific operations. For instance, after a card has been inserted into the card reader 225, the processor logic device may send a "read card" instruction to the card reader, a "display message A" instruction to the display 215 and a "good luck" voice message to a speaker. In addition, the logic devices 120 may be configured to allow the player tracking server 110 to send instructions to the player tracking devices via the logic devices 120. As an example, after a card has been inserted into the card reader 225, the processor logic 120 may determine that the card is for a gaming application controlled by the master gaming controller 144 and send a message to the player tracking server 110 indicating a card has been inserted into the card reader. In response to the message from the logic device, the player tracking server 110 may send a series of commands to the player tracking devices such as a "read card" instruction to the card reader 225, a flash light pattern "A" command to the light panel 122, and a "display message" instruction to the display 215 via the logic devices 120. The instructions from the player tracking server 110 to the player tracking devices may be obtained from player tracking application software executed by the player tracking server 110.

As depicted in the present embodiment, logic devices 120 can include a processor 136, memory 132, storage devices such as EPROM 134, communication board 138, network interface board 140, and firewall 142. In addition to the exemplary functions described above, logic devices 120 can include the logic necessary to make a bonus award presentation on the player tracking unit 104 (as described below in more detail with regard to FIG. 5), determine that a player makes a wager on a game prior to providing a bonus award for inserting the player tracking card into card reader 225, encourage game play by making a presentation on player tracking devices of the player tracking unit 104 alone or in synchronization with player tracking units 104 on other gaming machines (as described below in more detail with regard to FIG. 5), display a time stamp and/or sequence stamp assigned when a player accesses a player tracking account, make a presentation before or as part of a bonus award presentation at another gaming machine, and various other functions depending on the application. For instance, processor 136 can execute a bonus award presentation stored in memory 132, compact flash module 139, or on EPROM 134 when a bonus award is presented to a player of gaming machine 2. Communication board 138 can facilitate communications between logic devices 120, input/output devices 118, and master gaming controller 144, as well as any other components that may be included in gaming machine 2. Player tracking unit 104 can communicate with servers such as bonus server 108 and player tracking server 110 through network interface board 140 and firewall 142, as described above. Although firewall 142 can be included for security purposes, firewall 142 can be omitted in some applications.

Bonus server 108 includes memory 148, processor 150, and network interface board 152. The network interface board 152 allows communication between bonus server 108 and gaming system components such as player tracking units 104. Similarly, player tracking server 110 includes memory 172, processor 174, and network interface board 176. The network interface board 152 allows communication between bonus server 108 and gaming system components such as player tracking units 104. As described above with regard to FIG. 1, player tracking server 110 and bonus server 108 can operate in conjunction with each other or as a single server to issue a bonus award to a game player. Accordingly, one or both of these servers includes logic for detecting that a player has accessed a player tracking account stored on player tracking server 110. Furthermore, one or both of these servers includes logic for determining whether the player's access meets a bonus award criterion, such as insertion of a player tracking card into the gaming machines during a limited period of time, in a specified sequence, or the like, and providing a bonus award if such bonus criterion is met, as described in more detail below. For instance, one or both of the servers can include logic for assigning a time stamp and/or a sequence stamp each time the player tracking account is accessed. The logic can also include comparing the time stamp and/or sequence stamp to the bonus criterion. At least one of these servers can include logic for sending instructions to player tracking unit 104 to provide a bonus award presentation if a bonus award is won. In some embodiments, at least one of these servers can also include logic for notifying the gaming establishment or other gaming personnel when a bonus award has been provided. For those embodiments in which the player tracking server 110 includes logic for many of the functions described above, bonus server 108 can be omitted or combined with player tracking server 110. In other embodiments, bonus server 108 can store information regarding bonus award presentations that are accessible to player tracking units 104. For instance, player tracking units 104 can obtain the bonus award presentation files from bonus server 108 when a bonus award presentation is to be provided. Alternatively, player tracking units 104 can store bonus presentation files and bonus server 108 can provide instructions about which presentation should be provided.

Although a single gaming machine 2 is shown connected to bonus server 108 and player tracking server 110, it should be recognized any number of gaming machines and servers can be included in gaming system 100.

Figure 2:
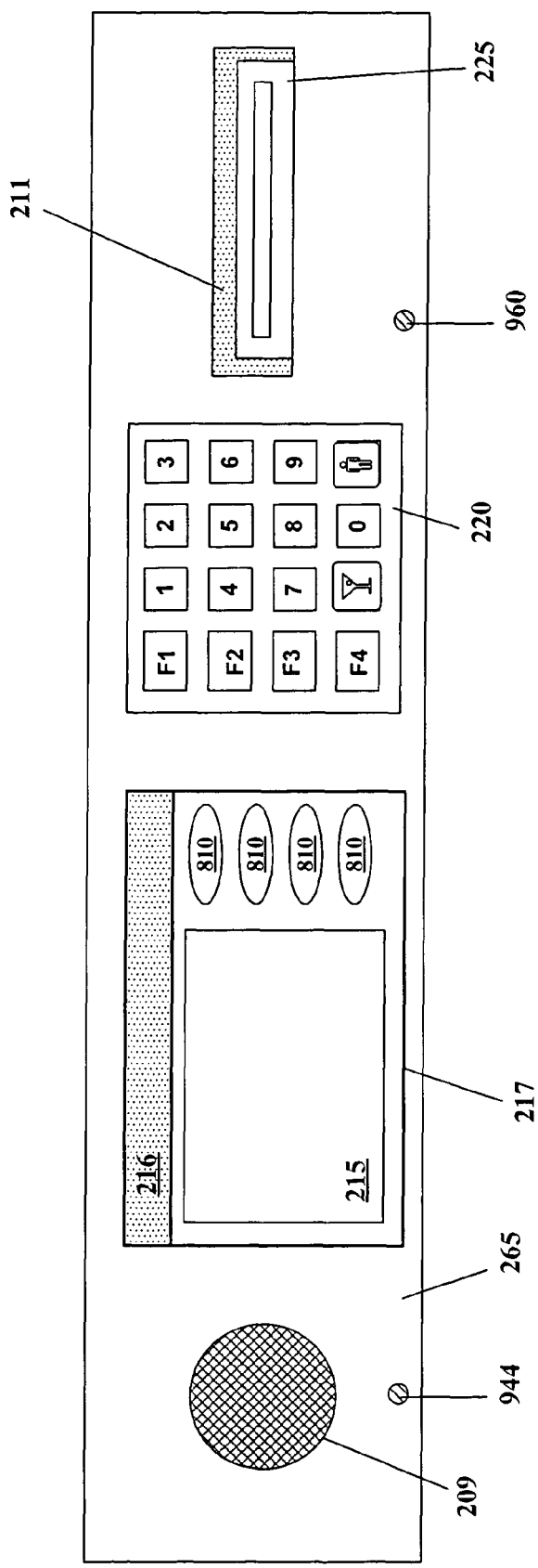
FIG. 2 is a diagrammatic representation of a player tracking user interface.

FIG. 2 is a diagrammatic representation of one embodiment of a player tracking user interface. The player tracking user interface can include interfaces with player tracking devices such as speaker 209, headphone jack 944, display 215, bezel 217, light panel 216, buttons 810, keypad 220, card reader 225, light panel 211, proximity sensor 960, and the like. These player tracking devices are mounted to or with respect to a face plate 230 (not shown), which is covered with a decorative skin 265.

Display 215 may be an LED, LCD, vacuum florescent, plasma display screen, touch screen, touch pad, or any other type of display technology. In one application, video clips may be presented on the display 215 and an audio clips may be projected through the speakers 209 or a player may be able to listen to the audio clips via headphones connected to a headphone jack 944. In addition to video clips, various messages, graphics, text, and the like, can be displayed on display 215. Furthermore, speakers 209 and headphone jack 944 can project various audio signals.

Bezel 217 can be located adjacent to display 215. As shown, bezel 217 can surround display 215 and can include a light panel 216 region and openings for buttons 810. The light panel 216 region may be made of a translucent or transparent material that allows light from LEDs or other light sources to be visible through the light panel 216 region, as described in more detail below with regard to FIG. 3A. Although a bezel is shown surrounding display 215, other configurations can be included within the scope of the present invention, such as when a light panel 216 is located adjacent to display 215 without a bezel, or when a light panel 216 is located adjacent to one or more sides of the display 215.

As described above, card reader 225 can be used to receive player tracking cards, and the like. A light panel 211 region can be located adjacent to the card reader. For example, the light panel region 211 can surround card reader 225 or can be located with respect one or more sides of the card reader. As shown, the light panel 211 region is adjacent to three sides of the card reader 225. The light panel 211 region may be made of a translucent or transparent material that allows light from LEDs or other light sources to be visible through the light panel 211 region.

Various input devices can be used to make selections. For instance, a touch screen or touch pad can be used to detect input selections. Selections also may be made using input buttons 810 or key pad 220. Any combination of these input devices can be used. For instance, if a touch screen is used, input buttons 810 and keypad 220 may be omitted. However, in other applications, even if a touch screen is used, more than one of the input devices can be used, thereby appealing to a wider array of players that may prefer to use different input devices.

In some embodiments, the player tracking unit may include a proximity sensor 960 (also described below with regard to FIG. 3A) to detect whether a player is in front of the gaming machine. In one embodiment, the proximity sensor may use an Infrared (IR) sensor, which periodically emits a particular pulse and examines reflected waves. The information from the IR sensor, such as when a player is near the gaming machine may be used to determine when an "attract" program on the player tracking unit is played.

Figure 3A:
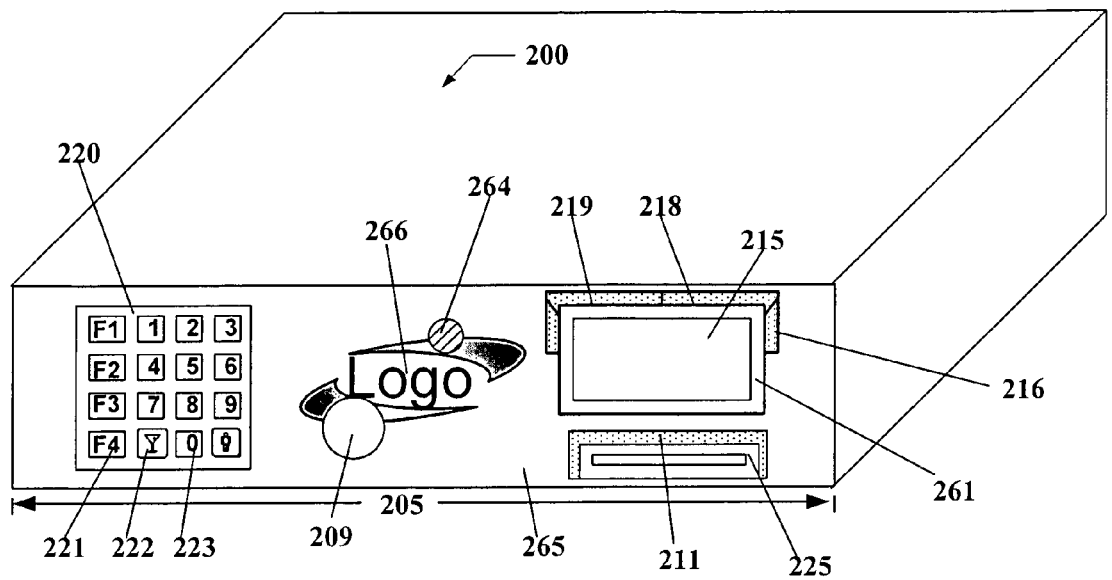
FIGS. 3A and 3B are perspective diagrams of player tracking units.
Figure 3B:
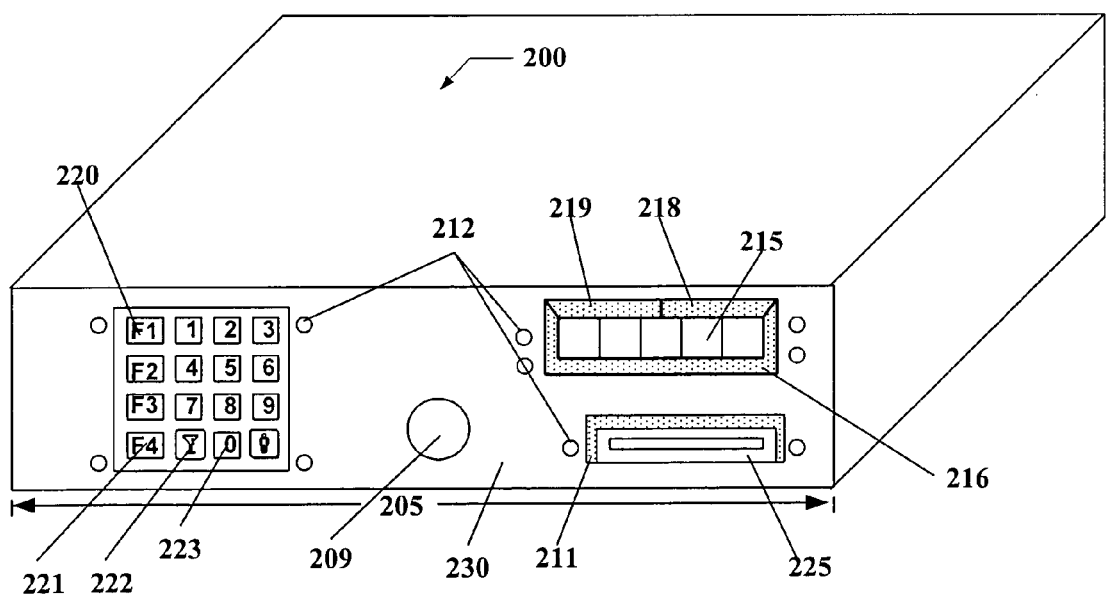

FIGS. 3A and 3B are perspective diagrams of player tracking units. In particular, FIG. 3A is a diagram showing a front side of one embodiment of a housing or chassis 200 enclosing a number of interface peripherals that may be used as player tracking interface devices. The interface peripherals may be used to provide input and output (I/O) to a player tracking system or may be used to provide I/O to other gaming systems such as a gaming machine. The device housing 200 may enclose a logic device (not shown) and other electronics configured to execute player tracking functions or the logic device may be enclosed in a logic device housing separate from the device housing 200.

Using the player tracking interface devices enclosed in the housing 200, gaming information, such as player tracking information, may be input to the player tracking unit and gaming information may be visually and aurally communicated to various individuals that may use the player tracking unit, such as game players, casino service representatives and maintenance technicians. Aspects of the present invention involve using illumination devices, such as back lit key pad buttons (e.g. 221, 222 and 223), light 211 and light 216 and sound projection devices, such as speaker 209, to visually and/or aurally communicate game information. The function buttons, F1, F2, F3 and F4 (i.e. 221) may be used to provide various services through the player tracking unit.

The device housing 200 encloses a display 215, a key pad 220, a microphone 207, a speaker 209, a card reader 225, a light 216 adjacent to the card reader 225 and a light 216 adjacent to the display 215. In other embodiments, the housing 200 may enclose many different combinations of player tracking interface devices, some of which are described above with regard to FIG. 2. For instance, additional gaming devices, such as biometric input devices, wireless interface devices cameras and bonus buttons, may also be enclosed in the device housing.

In the present embodiment, key pad 220 can include buttons, such as 221, 222 and 223, that may be back-lit by illumination devices of some type. The illumination devices, behind the key pad buttons, may be independently controlled to display various light and color patterns. The light and color patterns may be used during a bonus award presentation or to represent other game information. Details of a back-lit key pad used to convey gaming information are described in co-pending U.S. application Ser. No. 09/476,143, filed Jan. 3, 2000, by Powell et al., entitled, "A MICROCONTROLLED BACKLIT KEYPAD ASSEMBLY AND METHOD FOR A GAMING MACHINE" which is incorporated herein in its entirety and for all purposes.

The light 216, adjacent to the display 215 may use one or more illumination devices. Further, the light 216 may employ one or more types of lighting systems such as light emitting diodes (LED's), neon bulbs, incandescent bulbs, halogen bulbs, florescent bulbs, electro-luminescent lighting elements or combinations thereof. In a particular embodiment, the LED's may be multi-colored LED's. Details of providing electro-luminescent lighting elements to convey gaming information on a player tracking unit are described in co-pending U.S. patent application Ser. No. 10/139,801, filed May 3, 2002, by Winans et al., and entitled, "LIGHT EMITTING INTERFACE DISPLAYS FOR A GAMING MACHINE," which is incorporated herein in its entirety and for all purposes.

The light 216 may include a translucent cover with different segments, such as 218 and 219. The cover and cover segments 218 and 219 may be colored in some manner. For instance, cover segments 218 may be red and cover segment 219 may be blue while the remaining cover may be uncolored. The cover may be manufactured from a translucent plastic material. The cover segments 218 and 219 may protrude above the surface of face plate 230 (not shown) and decorative skin 265 to increase visibility of the light 216. The translucent cover may vary in shape. Depending on the lighting system used, the translucent cover may be removable to allow replacement of a defective bulb or other lighting system element.

The translucent cover with cover segments 218 and 219, may enclose one or more illumination devices. For instance, cover segment 219 may enclose a plurality of LED's while cover segment 218 may enclose a neon bulb. The illumination of each of the illumination devices may be independently controlled by electronics located within the device housing 200. The translucent cover may extend substantially surround the display 215 or the translucent cover may extend around a portion of the perimeter of the display 215. The display 215 may be an LED, LCD, vacuum florescent, plasma display screen, or any other type of display technology.

In some embodiments, each of the illumination devices is used to convey a different type of gaming information. For instance, a first illumination device may be illuminated in some manner to visually communicate player status information, whereas a second illumination device may be used to communicate card status information and a third illumination device may be used to communicate an error condition on the player tracking unit where combinations of two or more of the illumination devices may be illuminated at the same time. Additionally, in some embodiments, these illumination devices can be used as part of a bonus presentation to convey that a bonus award has been won.

As part of a bonus award, game event, or bonus game event, the illumination devices may be illuminated and/or a sound may be projected from the sound projection device. For instance, the illumination devices and/or sound projection devices can be activated. Furthermore, a video clip, message, or other communication mode can be included in the bonus presentation. In addition, gaming machines located in proximity to the gaming machine where a bonus award is provided may also activate their illumination, sound, and display devices to draw attention to the bonus award winner or to encourage the insertion of a player tracking card into one of the gaming machines. As another example, in response to a signal generated from a proximity sensor on the player tracking unit, such as an infrared device or a Bluetooth device that is activated when a person is in front of the gaming machine, the illumination devices may be illuminated and/or a sound may be projected from the sound projection device to attract a player's attention.

In general, the same game information may be communicated visually, aurally or both visually and aurally. Further, one type of game information may be communicated only aurally while another type of game information may be communicated only visually. For visual communication of game information, combinations of illumination devices in the light 216, the light 211 and the back-lit key pad buttons (e.g. 221, 222 and 223) may be illuminated in different color and light patterns that may vary with time and may last for only a specific duration. For instance, when a bonus award is presented, some of the lights (e.g. 216 or 211) on the housing 200 may flash in a pattern for a specific amount of time at specific intervals to attract a player's attention. In addition, the bonus presentation may include displaying a video clip and or projecting audio signals. For aural communication of game information or a bonus award, various sounds and verbal messages may be projected from a sound projection device such as the speaker 209. These sounds or messages may vary with time and may last for a specific duration of time.

The device housing 200 shown in the present embodiment may be installed in a gaming machine. Although the device housing 200 is shown as a rectangular box, the shape of the device housing 200 is variable and is not strictly limited to rectangular shapes. Furthermore, the dimensions of the player tracking interface devices may vary depending the manufacturer of a particular interface peripheral device. Typically, the dimensions of player tracking interface devices vary from manufacturer to manufacturer.

With reference to FIG. 3B, shown is another embodiment of a housing or chassis 200 enclosing a number of interface peripherals that may be used as player tracking interface devices. The present embodiment is similar to the embodiment shown in FIG. 3A, except that display 215 is a LED screen configured to display text or similar messages. In addition, decorative skin 265 has been removed, thereby exposing face plate 230.

In the present embodiment, face plate 230 surrounds the display 215, the key pad 220, the card reader 225, the light 216, the light 211, and the speaker 209. The face plate 230 may include mounting holes, such as 212, for mounting various player tracking interface devices to the face plate 230 such as the display 215. The face plate 230 includes cut-outs (not shown) that may allow access to the player tracking interface devices. For instance, a front portion of the light 216, a front portion of the display 215, and a front portion of the key pad 220 are visible through the face plate 230. The dimensions of the cut-outs on the face plate 230 for the player tracking interface devices may vary depending the manufacturer of a particular interface peripheral device which may be used in a player tracking device. As described above with regard to FIG. 3A, the dimensions of player tracking interface devices vary from manufacturer to manufacturer.

Figure 4:
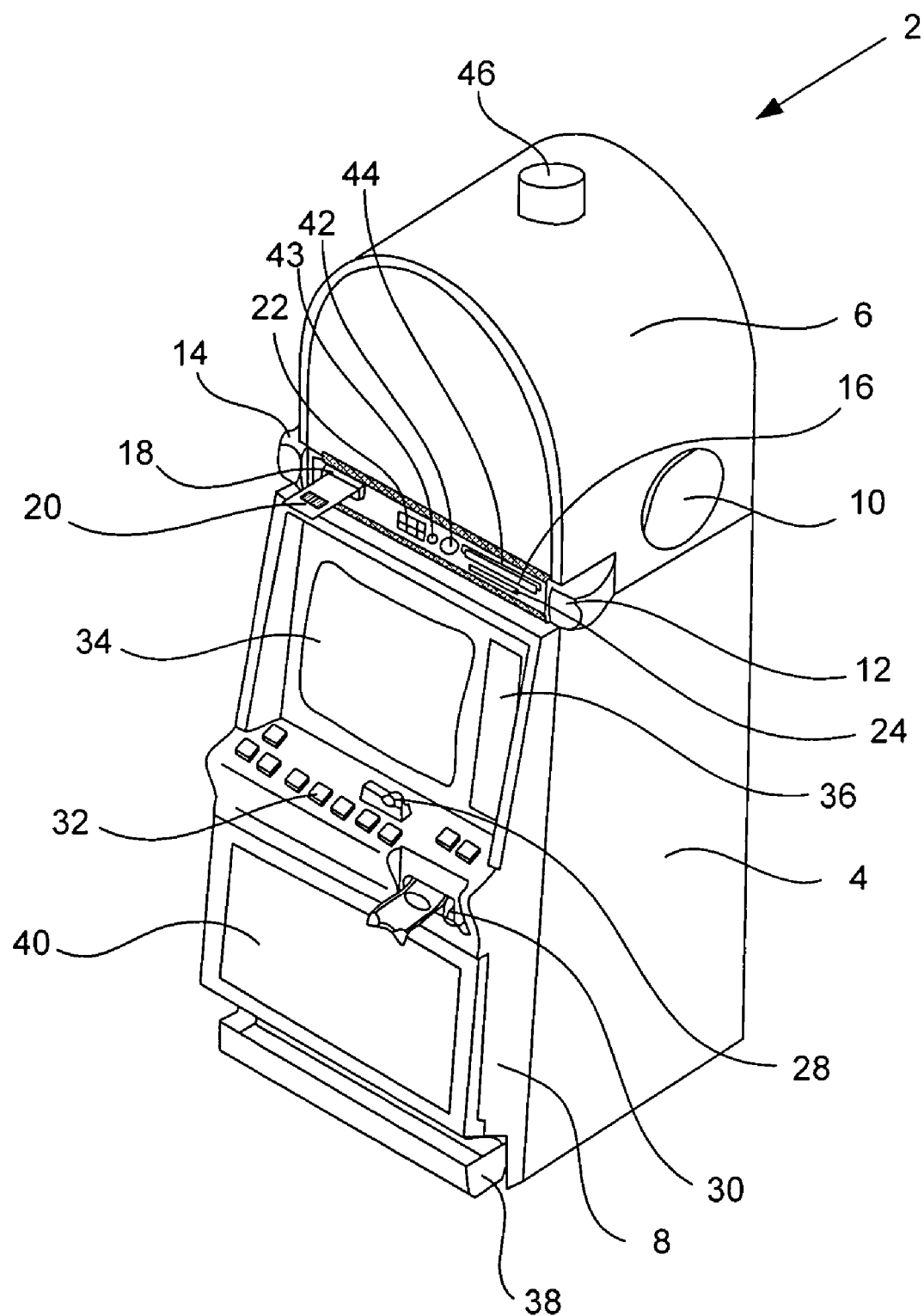
FIG. 4 is a perspective diagram of a video gaming machine.

With reference to FIG. 4, shown is a perspective diagram of a video gaming machine. Gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry housed inside the main cabinet 4 of the machine 2. Many possible games, including traditional slot games, video slot games, video poker, video black jack, video keno, video pachinko, lottery games and other games of chance as well as bonus games may be provided with gaming machines of this invention.

The gaming machine 2 includes a top box 6, which sits on top of the main cabinet 4. The top box 6 can house a number of devices, which may be used to add features to a game being played on the gaming machine 2, including speakers 10, 12, 14, and a ticket printer 18 which may print bar-coded tickets 20 used as cashless instruments. The player tracking unit mounted at the base of top box 6 can include various devices such as a key pad 22 for entering player tracking information, a florescent display 16 for displaying player tracking information, a card reader 24 for entering a magnetic striped card containing player tracking information, a microphone 43 for inputting voice data, a speaker 42 for projecting sounds and a light panel 44 for displaying various light patterns used to convey gaming information. A player playing a game on the gaming machine 2 or a person near the gaming machine may view the light patterns from the light panel 216. In other embodiments, the player tracking unit and associated player tracking interface devices, such as 16, 22, 24, 42, 43 and 44, may be mounted within the main cabinet 4 of the gaming machine, on top of the gaming machine, or on the side of the main cabinet of the gaming machine.

Understand that gaming machine 2 is but one example from a wide range of gaming machine designs on which the present invention may be implemented. For example, not all suitable gaming machines have top boxes. Further, some gaming machines have two or more game displays—mechanical and/or video. And, some gaming machines are designed for bar tables and have displays that face upwards. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 4, when a user wishes to play the gaming machine 2, he or she inputs some indicia of credit into the gaming machine 2. For instance, a player can insert cash through the coin acceptor 28 or bill validator 30. In addition, the player may use a cashless instrument of some type to register credits on the gaming machine 2. For example, the bill validator 30 may accept a printed ticket voucher, including 20, as indicia of credit. As another example, the card reader 24 may accept a debit card or a smart card containing cash or credit information that may be used to register credits on the gaming machine.

Prior to beginning a game play session on the gaming machine 2, a player may insert a player tracking card into the card reader 24 to initiate a player tracking session. In some embodiments, after inserting a card, the player may be visually prompted on the display screen 16 or aurally prompted using the speaker to enter identification information such as a PIN code using the key pad 22. Typically, the player tracking card may remain in the card reader 24 during the game play session. As another example, the gaming machine may transfer player tracking information from a portable wireless device worn by the player via a wireless interface device (not shown) on the gaming machine 2. An advantage of using a portable wireless device is that the transfer of player tracking information is automatic and the player does not have to remember to correctly insert a player tracking card into the gaming machine.

In a player tracking session on the gaming machine, features of the player's game play during a game play session on the gaming machine, such as an amount wagered during the game play session, may be converted to player tracking points and stored in the player's player tracking account on a player tracking server. Later, accumulated player tracking points may be redeemed for rewards or "comps" for the player such as free meals or free rooms. Usually, the player tracking card inserted into the card reader contains at least player tracking account information. When the card is inserted correctly into the card reader 24, the information stored on the card, such as the player's account information, may be read by the card reader and transferred by a logic device on the player tracking unit 104 to the player tracking server 110. The player tracking account information allows the player tracking server 110 to store player tracking points accumulated during the game play session to the appropriate account.

During the course of a game, a player may be required to make a number of decisions, which affect the outcome of the game. For example, a player may vary his or her wager on a particular game, select a prize for a particular game, or make game decisions that affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, such as a bonus award, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2, from lights behind the belly glass 40 or the light panel on the player tracking unit 44. Other visual effects include video clips or other messages displayed on display 16 (or 215 in FIGS. 2-3).

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services. In addition, when the player has inserted a player tracking card in the card reader to initiate a player tracking session, to prevent the player from leaving or "abandoning" their card in the card reader 24, a voice message, such as "please remove your card," may be projected from the sound projection device 44.

Figure 5:
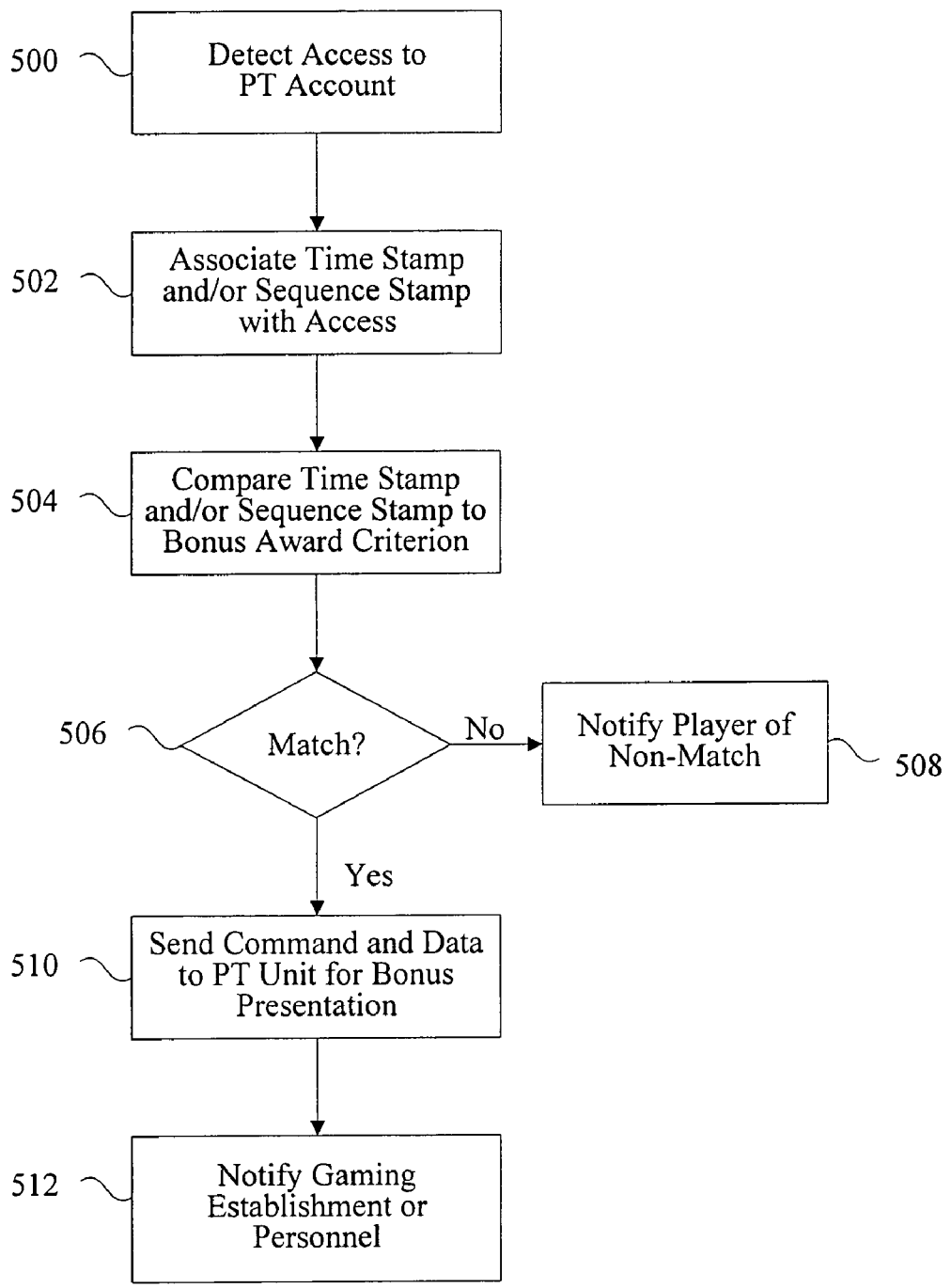
FIG. 5 is a flow diagram depicting a process for providing a bonus award to a player using a player-tracking account associated with a gaming establishment.

Turning now to FIG. 5, shown is a process flow diagram for providing a bonus award for using a player-tracking account associated with a gaming establishment. At 500, a player's access to a player tracking account is detected. For instance, a player can access a player tracking account using player account information, such as a player tracking identification number, by inserting a player tracking card into a card reader on a gaming machine controlled by a gaming establishment. In another example, a player can access a player tracking account by sending player tracking account information over a computer network when initiating an Internet gaming session. As described above, such player tracking account information can include a virtual player tracking card which can include information such as a player tracking card number, a password, and the like, that is sent over the Internet to the player tracking server. Although a player tracking account can include information about the player holding the account, some player tracking accounts may not specify the identity of a player holding the account, such as when anonymous cards are distributed to a tour group.

Next, at 502 through 506, a determination is made whether the player's access to the player tracking account satisfies one or more bonus award criteria. For instance, one type of bonus award criterion includes providing a bonus award if the player's access to the player tracking account occurs during a limited period of time specified by the gaming establishment. The limited period of time can be a randomly selected period of time, a fixed period of time, a period of time associated with an event or promotion, or the like. In some embodiments, the fixed period of time can be recurring. The limited period of time can be associated with an event such as a New Year's Eve celebration, a casino-sponsored boxing match, or the like. Specifically, bonus awards can be provided for some period before, during, and/or after such events. Furthermore, a time-based promotion may include bonus awards offered to players accessing their player tracking accounts during the next five minutes after a particular message is displayed on a player tracking display 215, or offered at a specified time such as 11 PM on a particular evening. Another example includes providing bonus awards during a "happy hour," wherein the player inserting their player tracking card closest to a randomly selected time during a two-hour period, such as 6:04 PM, receives a bonus award. In one embodiment, the player accessing a player tracking account closest to the limited period of time can be awarded the bonus award. For example, the player accessing a player tracking account closest to 11 PM on a particular evening can be awarded the bonus award. Bonus award criteria can be advertised on the gaming machines, at gaming establishment events, as part of gaming establishment promotions or advertising, and the like. Bonus awards can be awarded to a selected player or number of players accessing their player tracking accounts during the limited period of time or bonus awards can be awarded to all players accessing their player tracking accounts during the limited period of time.

Another type of bonus award criterion includes providing a bonus award if the player's access to the player tracking account occurs in a specified sequence in relation to accesses by other players. For instance, a bonus award can be provided to the 100th player to insert their player tracking card into a gaming machine displaying a particular message. In some embodiments, these two types of bonus award criteria can be combined such that both the time and sequence of accesses is used to determine a bonus award winner or winners. For instance, the 100th player to access their player tracking account after 5 PM can be provided with a bonus award.

At 502, a time stamp and/or sequence stamp is associated with the player's access to the player tracking account, depending on what bonus award criteria are used. For instance, when a player tracking card is inserted into a card reader, player tracking account information from the player tracking card is used to access a player tracking account on player tracking server 110. When the player tracking account is accessed on player tracking server 110, a time stamp can be associated with the player tracking account. Similarly, a sequence stamp can be associated with the player tracking account in relation to accesses made by other players to their player tracking accounts. As described above, such time stamps and sequence stamps can be assigned by a bonus server 108, a player tracking server 110, or the like.

Next, at 504, the time stamp and/or sequence stamp is compared to one or more bonus award criteria specified by the gaming establishment. For instance, if the bonus award criterion is the player accessing their player tracking account closest to a limited period of time centered at 6:04 PM, the time stamp is compared to 6:04 PM, and may also be compared to other player or accesses near that time.

At 506, a determination is made whether the time stamp and/or sequence stamp matches the bonus award criterion or criteria. If not, then at 508, a player can be notified of a non-match. For instance, the time stamp and/or sequence stamp can be displayed in relation to other players accesses or to a specified sequence number or limited period of time. In addition, a message such as "please try again" can be displayed. Alternatively, item 508 can be omitted in some applications, such as when a gaming establishment does not wish to disturb a player's game play.

If a match is found at 506, then at 510 a bonus award can be provided. In particular, a command to provide a bonus award presentation, along with any other data, can be sent to the winning player tracking unit. A bonus award can include items such as credit, cash, a non-cash prize, free play, improving the odds of winning at a particular game, and the like. Improving the odds of winning at a particular game can be easily implemented by modifying a pay table on the gaming machine. In addition, bonus awards can be implemented as bonus-on-bonus awards. For instance, a bonus award may be a doubling of any points earned during another bonus game or during a specified time period. In another example, progress towards a prize, award, or the like, can be displayed on the gaming machine, in the form of accumulated credits, symbols, pieces of a puzzle, or the like. These credits, symbols, pieces of a puzzle, or the like, can be awarded as bonus awards. For example, if progress is shown as a puzzle, pieces of the puzzle can be awarded as bonus awards, and the accumulated pieces of the puzzle can be displayed with respect to the puzzle on the gaming machine. When the puzzle is complete, or otherwise satisfies a winning configuration, an award, prize, or the like, can be provided to the player. In another example, the progress can be shown as a word, such that letters can be collected to spell out the word. If all of the letters of the word are collected, then an award, prize, or the like, can be provided. In another embodiment, progress can be shown as a diagram. For example, a line graph can show the player's progress and can indicate a level at which a winning configuration is achieved. When the line graph reaches this level, an award, prize, or the like, can be provided to the player. Other configurations are also possible.

The bonus award presentation provided on the player tracking device can include lighting a region of the player tracking device with a specified color, specified lighting sequence, or combination thereof. For instance, lighting a region of the player tracking device can include lighting a light panel region or bezel, as described above with regard to FIGS. 2 and 3. Furthermore, the bonus award presentation can include displaying a video clip, issuing an audio signal, displaying a message on the player tracking device, or any combination thereof. In addition, the bonus award presentation can include issuing a light signal, issuing an audio signal, displaying a video clip, or any combination thereof, on multiple player tracking devices prior to or coincident with a bonus award presentation on a winning gaming machine, in order to encourage other players to participate in such bonus award promotions. The bonus award promotions and presentations and a schedule for promotions/presentations may be regularly updated via downloads from a remote server, such as bonus server 108, player tracking 110, or the like. The promotions and presentations may be updated to reflect different events throughout the year. For instance, during holiday periods, the graphics and sound used in the video and audio portions of promotions presented on the player tracking units may reflect holiday themes or seasonal themes.

At 512, the gaming establishment or gaming personnel can be notified that the bonus award has been provided. For instance, the record of all bonus awards provided can be compiled and stored at the player tracking server 110. In some embodiments, item 512 can be omitted, such as when the bonus award includes free game play or a small cash or credit prize.

In some embodiments, prior to providing a bonus award at 510, a determination can be made that a player has made a wager on a game. This additional determination can prevent players from inserting player tracking cards sequentially into gaming machines during promotional periods without playing any games, which can be disruptive to other players, and can provide little incentive for gaming establishments to implement bonus award programs.

Furthermore, in some embodiments, prior to detecting that a player has accessed a player tracking account using a player tracking unit on a gaming machine, the player tracking unit can issue an audio signal and/or light signal, display a message, display a video clip, or the like, or any combination thereof, in order to encourage game play on the gaming machine and insertion of a player tracking card into the player tracking unit. For instance, a promotion can be advertised on the gaming machine to entice players to insert their player tracking cards into selected gaming machines at a certain time by displaying a countdown to a bonus award winner, which can be displayed as a time or sequence number countdown, or the like. Additionally, the signals or displays can be synchronized with other player tracking devices to attract players to those gaming machines that are not currently being played.

It should be recognized that although a particular sequence of items are described with regard to the present embodiment, modifications can be made within the scope of the present invention. For instance, other modes of determining whether a player's access matches a chosen bonus award criterion can be used. In addition, some items can be omitted, such as notifying the player of a non match 508, or notifying the gaming establishment or gaming personnel that a bonus award has been provided 512.

Figure 6:
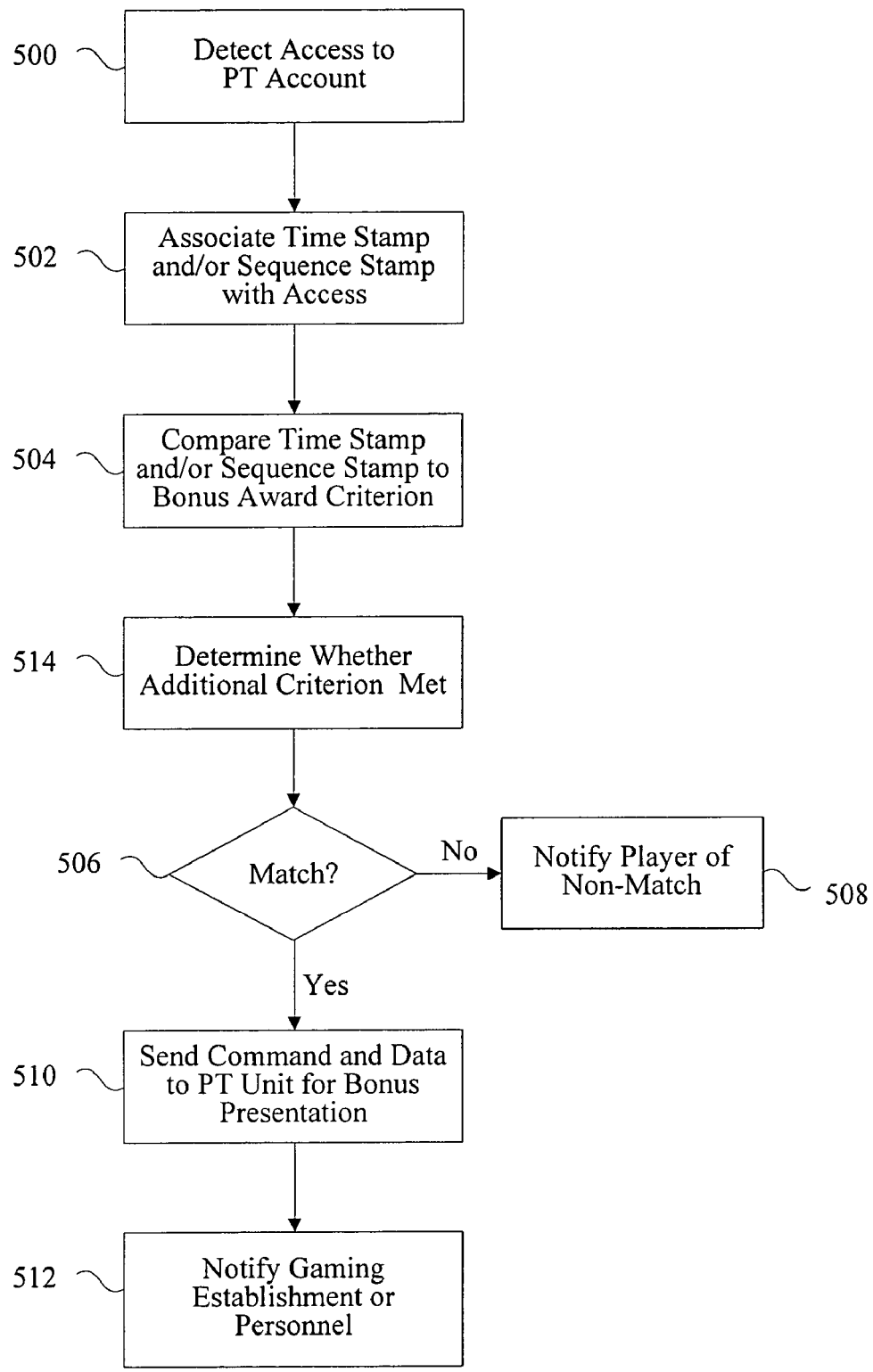
FIG. 6 is another flow diagram depicting a process for providing a bonus award to a player for using a player-tracking account associated with a gaming establishment.

FIG. 6 is another flow diagram depicting a process for providing a bonus award for using a player-tracking account associated with a gaming establishment. The present embodiment is similar to the embodiment described above with regard to FIG. 5, except that at 514, a determination is made whether the player accesses a player tracking account in a manner meeting an additional criterion for providing a bonus award. In one example, if particular games or machines (e.g. slant top machines, machines displaying a certain message, machines with a certain theme, etc.) are played, the additional criterion is met. In another example, games with a particular denomination (e.g. nickel slots, etc.) may trigger eligibility for a bonus award. Bonus award eligibility may also be associated with a selected group of players (e.g. platinum club, high rollers, tour group, conference group, etc.), such that only members of the group satisfy the additional criterion and are eligible to receive bonus awards.

CONCLUSION

Although the above generally describes the present invention according to specific exemplary processes and apparatus, various modifications can be made without departing from the spirit and/or scope of the present invention. Therefore, the present invention should not be construed as being limited to the specific forms shown in the appended figures and described above.

What is claimed is:

1. A method of providing a bonus award for using a player tracking account associated with a gaming establishment, the method comprising:

(a) detecting that a player has accessed the player tracking account using at least one server including a processor, memory and a communication interface configured to communicatively couple the at least one server to a gaming machine;

(b) determining whether the player accessed the player tracking account within a limited period of time allotted for awarding the bonus award for using the player tracking account, wherein the determination is made using the at least one server by associating a time stamp with the player's access to the player tracking account and wherein determining whether the player accessed the player tracking account within a limited period of time includes comparing the time stamp with the limited period of time;

(c) determining, using the at least one server, whether the player accessed the player tracking account in a manner meeting an additional criterion for awarding the bonus award other than accessing the player tracking account within the limited period of time wherein the additional criterion includes having the player's access to the player tracking account match a specified sequence number in a sequence of player tracking account accesses by multiple players;

(d) if the player both accessed the player tracking account in a manner meeting the additional criterion and within the limited period of time, providing the bonus award for using the player tracking account by making a bonus award presentation on a player tracking device associated with a gaming machine; and (e) prior to providing the bonus award for using the player tracking account, using the at least one the server to determine that the player made a wager on a game.

2. The method of claim 1, wherein the gaming establishment is a casino or group of affiliated casinos.

3. The method of claim 1, wherein the bonus award comprises credit, cash, a non-cash prize, free play, improving the odds of winning at a particular game, or any combination thereof.

4. The method of claim 1, wherein detecting that a gaming player has accessed the player tracking account comprises detecting an insertion of a player tracking card into a gaming machine controlled by the gaming establishment.

5. The method of claim 1, wherein detecting that a gaming player has accessed the player tracking account comprises detecting that the player has sent player tracking account information over a computer network as part of an Internet gaming session.

6. The method of claim 5, wherein the player tracking account information includes a virtual player tracking card, wherein the virtual player tracking card includes a player tracking account number.

7. The method of claim 1, wherein the player tracking account does not specify the identity of the player holding the account.

8. The method of claim 1, wherein the limited period of time is a randomly selected period of time, a fixed period of time, or a period of time associated with an event or promotion.

9. The method of claim 8, wherein the fixed period of time is a recurring fixed period of time.

10. The method of claim 1, wherein the additional criterion comprises playing a predefined game or machine or using a particular denomination to play a game.

11. The method of claim 10, wherein the predefined machine is a machine displaying a selected message or a machine with a selected theme.

12. The method of claim 10, wherein the predefined machine is an upright machine or a slant top machine.

13. The method of claim 1, wherein the additional criterion is that the player tracking account is associated with a selected group of players.

14. The method of claim 1, further comprising associating a sequence stamp with the player's access to the player tracking account, and wherein having the player's access to the player tracking account match a specified sequence number includes having the sequence stamp match the specified sequence number.

15. The method of claim 14, further comprising displaying the sequence stamp in relation to other players' sequence stamps or in relation to the specified sequence number if the sequence stamp does not match the specified sequence number.

16. The method claim 1, wherein making the bonus award presentation comprises lighting a region of the player tracking device with a specified color, a specified lighting sequence, or a combination thereof.

17. The method of claim 16, wherein lighting a region of the player tracking device comprises lighting a bezel on the player tracking device.

18. The method of claim 17, wherein the bezel is located adjacent to a video display on the player tracking device.

19. The method of claim 1, further comprising issuing a light signal, issuing an audio signal, displaying a video clip, or any combination thereof, on multiple player tracking devices associated with multiple gaming machines prior to making a bonus award presentation on a player tracking device associated with the bonus award provided.

20. The method of claim 1, wherein making the bonus award presentation comprises displaying a video clip, issuing an audio signal, displaying a message, or any combination thereof, on the player tracking device.

21. The method of claim 1, further comprising notifying the gaming establishment or casino personnel if the bonus award is provided.

22. The method of claim 1, further comprising encouraging game play by issuing a light signal, issuing an audio signal, displaying a message, displaying a video clip, or any combinations thereof, on a player tracking device associated with a gaming machine prior to detecting that the gaming player has accessed the player tracking account.

23. The method of claim 22, wherein encouraging game play further includes synchronizing the signal or display on the player tracking device with other player tracking devices associated with other gaming machines.

24. A method of providing a bonus award for using a player tracking account associated with a gaming establishment, the method comprising:

(a) detecting that a gaming player has accessed the player tracking account using a server including a processor, memory and a communication interface configured to communicatively couple the server to a gaming machine;

(b) determining, using the server, whether the player's access to the player tracking account occurred within a limited time period of time allotted for awarding the bonus award and whether it matches a specified sequence number in a sequence of player tracking account accesses by other players to their respective player tracking accounts;

(c) if the player's access to the player tracking account matches the specified sequence number and if it occurred within the limited period of time, providing the bonus award for using the player tracking account by making a bonus award presentation on a player tracking device associated with a gaming machine if the bonus award is provided; and (d) prior to providing the bonus award for using the player tracking account, determining, using the server, that the player made a wager on a game.

25. The method of claim 24, wherein the gaming establishment is a casino or group of affiliated casinos.

26. The method of claim 24, wherein the bonus award comprises credit, cash, a non-cash prize, free play, improving the odds of winning at a particular game, or any combination thereof.

27. The method of claim 24, wherein detecting that a gaming player has accessed the player tracking account comprises detecting an insertion of a player tracking card into a gaming machine controlled by the gaming establishment.

28. The method of claim 24, wherein detecting that a gaming player has accessed the player tracking account comprises detecting that the player has sent player tracking account information over a computer network as part of an Internet gaming session.

29. The method claim 24, wherein making the bonus award presentation comprises lighting a region of the player tracking device with a specified color, a specified lighting sequence, or a combination thereof.

30. The method of claim 29, wherein lighting a region of the player tracking device comprises lighting a bezel on the player tracking device.

31. The method of claim 30, wherein the bezel is located adjacent to a video display on the player tracking device.

32. The method of claim 24, further comprising issuing a light signal, issuing an audio signal, displaying a video clip, or any combination thereof, on multiple player tracking devices associated with multiple gaming machines prior to making a bonus award presentation on a player tracking device associated with the bonus award provided.

33. The method of claim 24, wherein making the bonus award presentation comprises displaying a video clip, issuing an audio signal, displaying a message, or any combination thereof, on the player tracking device.

34. The method of claim 24, further comprising notifying the gaming establishment or casino personnel if the bonus award is provided.

35. The method of claim 24, further comprising encouraging game play by issuing a light signal, issuing an audio signal, displaying a message, displaying a video clip, or any combinations thereof, on a player tracking device associated with a gaming machine prior to detecting that the gaming player has accessed the player tracking account.

36. The method of claim 24, wherein encouraging game play further includes synchronizing the signal or display on the player tracking device with other player tracking devices associated with other gaming machines.

37. A gaming machine system comprising:
a plurality of gaming machines, each comprising:
one or more processors controlling game play on the gaming machine,
a player tracking device comprising a light bezel, a video display, and a player tracking card reader, and
a network interface for communications to and from the player tracking device; and
a player tracking server comprising:
a server network interface for communicating with said player tracking devices;
logic for issuing a bonus award triggered by insertion of a player tracking card in the card reader at one of the gaming machines (i) during a limited period of time allotted for awarding said bonus award, and (ii) when insertion of the player tracking card matches a specified sequence number in a sequence of other player tracking card insertions by other players to access their respective player tracking accounts at the plurality of gaming machines; and
logic for determining that a player made a wager on a game prior to providing the bonus award for inserting the player tracking card in the card reader.

38. The gaming machine system of claim 37, further comprising logic for communicating, via the server network interface, issuance of the bonus award to one of the gaming machines.

39. The gaming machine system of claim 37, wherein each of the plurality of gaming machines further comprise logic for making a bonus award presentation on the player tracking device.

40. The gaming machine system of claim 39, wherein making the bonus award presentation comprises lighting a region of the player tracking device with a specified color, a specified lighting sequence, or a combination thereof.

41. The gaming machine system of claim 40, wherein lighting a region of the player tracking device comprises lighting the light bezel on the player tracking device.

42. The gaming machine system of claim 39, wherein each of the plurality of gaming machines further comprise logic for issuing a light signal, issuing an audio signal, displaying a video clip, or any combination thereof, on multiple player tracking devices associated with multiple gaming machines prior to making a bonus award presentation on a player tracking device associated with the bonus award provided.

43. The gaming machine system of claim 39, wherein making the bonus award presentation comprises issuing an audio signal, displaying a video clip, displaying a message, or any combination thereof on the player tracking device.

44. The gaming machine system of claim 37, wherein the light bezel is located adjacent said video display.

45. The gaming machine system of claim 37, wherein each of the plurality of gaming machines further comprises logic for issuing a light signal, issuing an audio signal, displaying a message, displaying a video clip, or any combinations thereof, on the player tracking device to encourage the insertion of a player tracking card into the card reader.

46. The gaming machine system of claim 45, wherein the plurality of gaming machines are configured to encourage the insertion of a player tracking card into the card reader by lighting the light bezel, displaying a message on the video display, or any combination thereof, in synchronization.

47. The gaming machine system of claim 37, wherein the bonus award comprises credits, cash, a non-cash prize, free play, improving the odds of winning at a particular game, or any combination thereof.

48. The gaming machine system of claim 37, wherein the player tracking server is configured to assign a time stamp, a sequence stamp, or both the time stamp and the sequence stamp for each insertion of a player tracking card in the card reader of any of the plurality of gaming machines.

49. The gaming machine system of claim 48, wherein the logic for issuing a bonus award includes comparing the time stamp with the limited period of time, comparing the sequence stamp with the specified sequence number, or a combination thereof.

50. The gaming machine system of claim 49, wherein the player tracking device is configured to display the time stamp, sequence stamp, or both the time stamp and the sequence stamp in relation to other players' stamps or in relation to the limited period of time or specified sequence number if a bonus award is not triggered.

51. The gaming machine system of claim 37, wherein the plurality of gaming machines is associated with a casino or group of affiliated casinos.

52. The gaming machine system of claim 37, wherein the player tracking server further comprises logic for notifying casino personnel if the bonus award is provided.

* * * * *